(12) United States Patent
Zhang et al.

(10) Patent No.: US 11,675,772 B2
(45) Date of Patent: Jun. 13, 2023

(54) UPDATING ATTRIBUTES IN DATA

(71) Applicant: EMC IP Holding Company LLC, Hopkinton, MA (US)

(72) Inventors: Xingzhou Zhang, Shanghai (CN); Zhen Xu, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 463 days.

(21) Appl. No.: 16/917,493

(22) Filed: Jun. 30, 2020

(65) Prior Publication Data

US 2021/0342327 A1   Nov. 4, 2021

(30) Foreign Application Priority Data

Apr. 30, 2020   (CN) .......................... 202010367892.4

(51) Int. Cl.
  *G06F 16/23* (2019.01)
  *G06F 16/11* (2019.01)
  *G06F 16/16* (2019.01)
  *G06F 16/17* (2019.01)

(52) U.S. Cl.
  CPC .......... *G06F 16/235* (2019.01); *G06F 16/122* (2019.01); *G06F 16/164* (2019.01); *G06F 16/1734* (2019.01)

(58) Field of Classification Search
  CPC ........ G06F 16/23; G06F 16/235; G06F 16/11; G06F 16/16; G06F 16/17; G06F 16/122; G06F 16/164; G06F 16/1734
  USPC .................................................. 707/609, 649
  See application file for complete search history.

(56) References Cited

U.S. PATENT DOCUMENTS

| | | | | |
|---|---|---|---|---|
| 6,226,710 B1* | 5/2001 | Melchior | .......... | G06F 16/90339 707/E17.035 |
| 6,324,581 B1* | 11/2001 | Xu | ....... | G06F 16/1774 709/213 |
| 7,171,431 B2* | 1/2007 | Shimizu | .................. | G06F 16/10 |
| 8,001,096 B2* | 8/2011 | Farber | .................. | G06F 16/164 707/699 |
| 8,805,789 B2* | 8/2014 | Berman | .............. | G06F 11/1451 707/649 |
| 8,914,334 B2* | 12/2014 | Berman | .................. | G06F 16/11 707/649 |

(Continued)

*Primary Examiner* — Shahid A Alam
(74) *Attorney, Agent, or Firm* — Amin, Turocy & Watson, LLP

(57) ABSTRACT

An information processing method can comprise updating, in response to an update request for a first item in a file system, first attribute information associated with the first item in an ordered data set comprising entries corresponding to items in the file system, the entries indicating path information of storage paths of the items and attribute information associated with the items, and entries corresponding to items under the same directory being consecutively organized in the ordered data set; determining a second item associated with the first item, a parent directory of the second item being same as that of the first item; acquiring second attribute information associated with the second item from the ordered data set; and determining, based on at least the first attribute information and the second attribute information, attribute information associated with the parent directory. The management efficiency of the file system can thus be improved.

20 Claims, 3 Drawing Sheets

(56) References Cited

U.S. PATENT DOCUMENTS

| | | | | |
|---|---|---|---|---|
| 9,684,593 | B1* | 6/2017 | Chen | G06F 11/1469 |
| 2001/0054042 | A1* | 12/2001 | Watkins | G06F 16/168 |
| 2003/0009484 | A1* | 1/2003 | Hamanaka | G06F 16/10 |
| 2012/0173845 | A1* | 7/2012 | Venkataramani | G06F 16/24539 |
| | | | | 711/216 |
| 2015/0310034 | A1* | 10/2015 | Godman | G06F 16/2358 |
| | | | | 707/613 |

* cited by examiner

UPDATING ATTRIBUTES IN DATA

RELATED APPLICATION

The present application claims the benefit of priority to Chinese Patent Application No. 202010367892.4, filed on Apr. 30, 2020, which application is hereby incorporated into the present application by reference herein in its entirety.

TECHNICAL FIELD

Embodiments of the present disclosure relate to the field of computers, and in particular, to a method, a device, and a computer program product for information processing.

BACKGROUND

In recent years, with the development of computer technologies, computer-managed file systems are also growing in size. Typically, information about the folders and files is organized in a hierarchical structure (for example, a tree structure). However, once one of the files is updated, the file system may need to update a large number of files. Therefore, how to improve efficiency of information processing becomes a current focus of attention.

SUMMARY

A solution for information processing is provided in the embodiments of the present disclosure.

According to a first aspect of the present disclosure, a method for information processing is proposed. The method comprises: updating, in response to an update request for a first item in a file system, first attribute information associated with the first item in an ordered data set, the ordered data set comprising a plurality of entries corresponding to a plurality of items in the file system, the plurality of entries indicating path information of storage paths of the plurality of items and attribute information associated with the plurality of items, and entries corresponding to items under the same directory being consecutively organized in the ordered data set; determining a second item associated with the first item from the file system, a parent directory of the second item being the same as that of the first item; acquiring second attribute information associated with the second item from the ordered data set; and determining, based at least on the first attribute information and the second attribute information, attribute information associated with the parent directory.

According to a second aspect of the present disclosure, a device for information processing is proposed. The device comprises: at least one processing unit; and at least one memory coupled to the at least one processing unit and storing instructions configured to be executed by the at least one processing unit, wherein when executed by the at least one processing unit, the instructions cause the device to perform actions comprising: updating, in response to an update request for a first item in a file system, first attribute information associated with the first item in an ordered data set, the ordered data set comprising a plurality of entries corresponding to a plurality of items in the file system, the plurality of entries indicating path information of storage paths of the plurality of items and attribute information associated with the plurality of items, and entries corresponding to items under the same directory being consecutively organized in the ordered data set; determining a second item associated with the first item from the file system, a parent directory of the second item being the same as that of the first item; acquiring second attribute information associated with the second item from the ordered data set; and determining, based at least on the first attribute information and the second attribute information, attribute information associated with the parent directory.

In a third aspect of the present disclosure, a computer program product is provided. The computer program product is tangibly stored in a non-transitory computer storage medium and comprising machine-executable instructions, wherein when run in a device, the machine-executable instructions cause the device to perform any step of the method described according to the first aspect of the present disclosure.

The summary is provided to introduce the choice of concepts in a simplified form, which will be further described in the following Detailed Description. The summary is neither intended to identify key features or necessary features of the present disclosure, nor intended to limit the scope of the present disclosure.

BRIEF DESCRIPTION OF THE DRAWINGS

The above and other objectives, features, and advantages of the present disclosure will become more obvious by describing example embodiments of the present disclosure in more detail with reference to the accompanying drawings. In the example embodiments of the present disclosure, identical reference numerals generally represent identical members.

DETAILED DESCRIPTION

Embodiments of the present disclosure will be described in more detail below with reference to the accompanying drawings. The various embodiments of the present disclosure are shown in the accompanying drawings. However, it should be understood that the present disclosure may be implemented in various forms and should not be limited by the embodiments described here. Conversely, the embodiments are provided to make the present disclosure more thorough and complete and to enable the scope of the present disclosure to be fully conveyed to those skilled in the art.

The term "include" and its variants as used herein indicate open inclusion, i.e., "including, but not limited to." Unless specifically stated otherwise, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As discussed above, metadata of a file system is generally maintained by a hierarchical structure. A user generally may relate total attribute information (e.g., a folder size, a modification time, and so on) under a directory, and such information generally needs to be obtained by traversal of files under the directory. When a file or directory is updated, attribute information of a parent directory of the file or directory also needs to be updated accordingly. When a file system is large in scale, such an updating operation often takes a long time.

A solution for information processing is provided according to the embodiments of the present disclosure. In the solution, when an update request for a first item in a file system is received, first attribute information associated with the first item is updated in an ordered data set. The ordered data set includes a plurality of entries corresponding to a plurality of items in the file system, wherein the plurality of entries indicate path information of storage paths of the plurality of items and attribute information associated with the plurality of items, and entries corresponding to items under the same directory are consecutively organized in the ordered data set. Then, a second item in the same parent directory as the first item is in may be determined from the file system, and second attribute information associated with the second item is acquired from the ordered data set. Then, the first attribute information and the second attribute information may be further used to determine attribute information associated with the parent directory. In such a manner, the efficiency of information processing for the file system can be improved according to the embodiments of the present disclosure.

Figure 1:
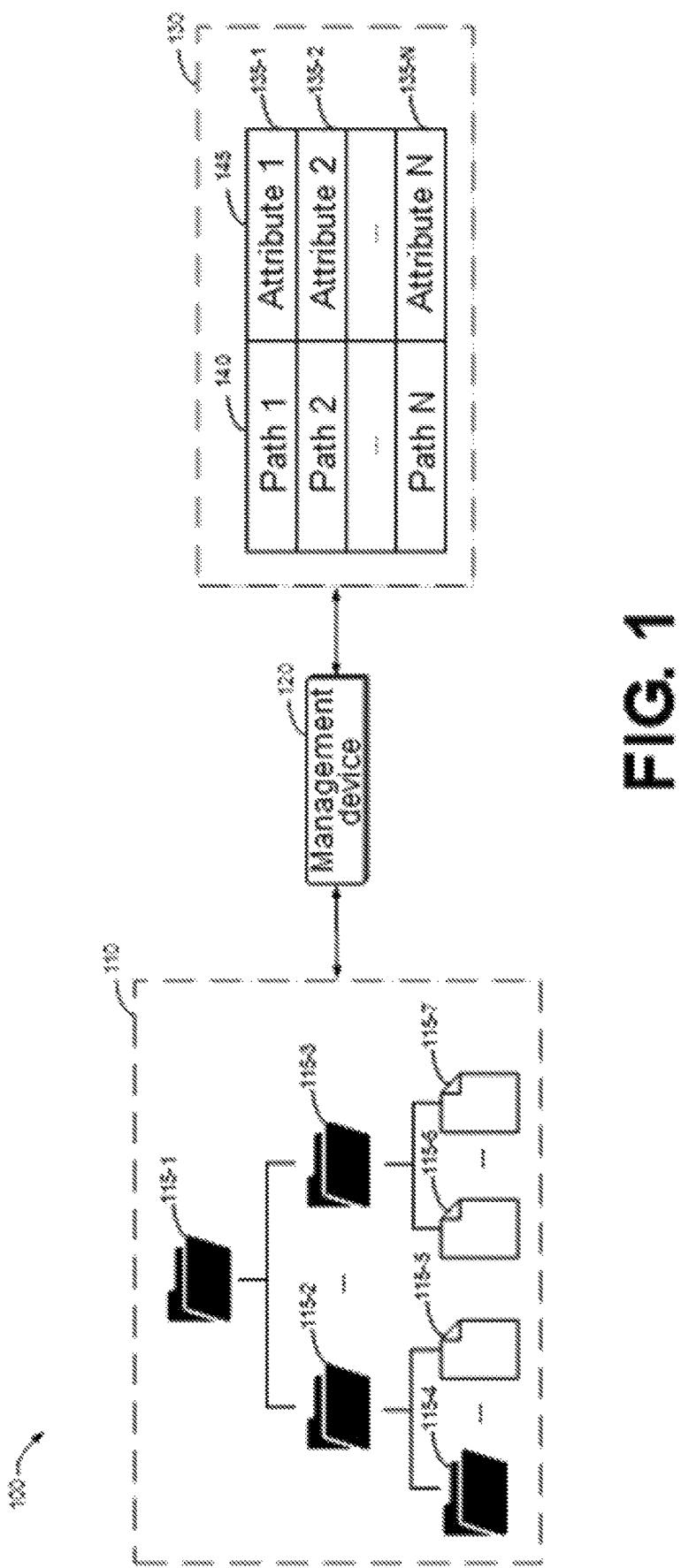
FIG. 1 is a schematic diagram of an environment in which an embodiment of the present disclosure can be implemented.

FIG. 1 is a schematic diagram of environment 100 in which an embodiment of the present disclosure can be implemented. As shown in FIG. 1, environment 100 includes file system 110 and management device 120. File system 110 may include a multi-level directory structure. For example, in the example of FIG. 1, file system 110 includes root directory 115-1, and root directory 115-1 includes subdirectories 115-2 and 115-3. Subdirectory 115-2 further includes subdirectory 115-4 and file 115-5, and subdirectory 115-3 includes files 115-6 and 115-7.

As shown in FIG. 1, management device 120 may maintain information of file system 110 through data set 130. In the embodiment of the present disclosure, data set 130 may be an ordered data set, which includes entries 135-1, 135-2, and 135-N (individually or collectively referred to as "entry" 135) corresponding to files or directories (also referred to as "items") included in file system 110. Each entry includes path information 140 indicating storage paths of the items and attribute information 145 associated with the items. Attribute information 145 may be, for example, information indicating attributes of a file or directory, such as the size, latest modification time, and creation time of the file or directory.

In addition, different from a conventional data set, in ordered data set 130, entries corresponding to items under the same directory will be consecutively organized in ordered data set 130. An organization form of ordered data set 130 will be described in detail below.

Figure 2:
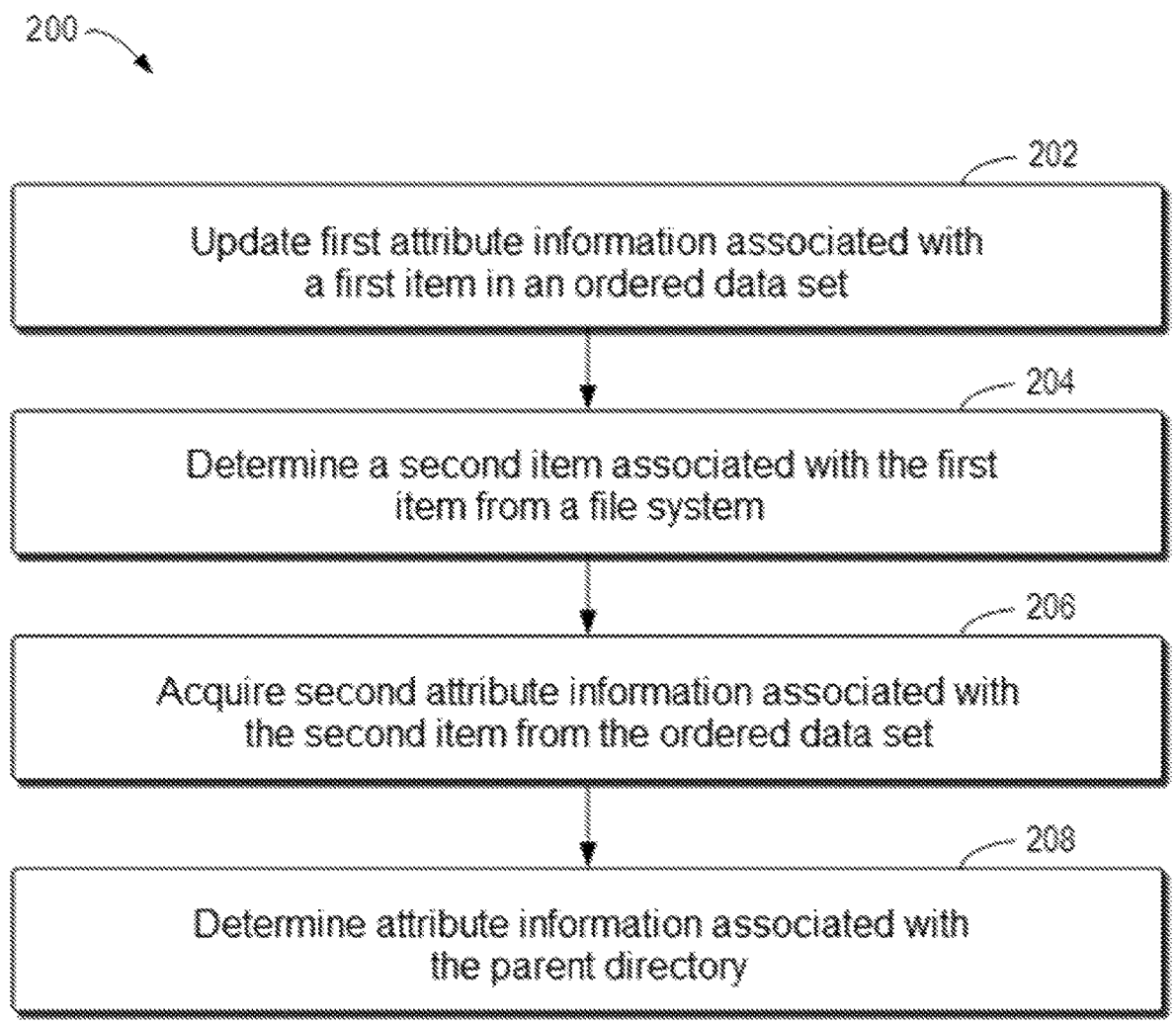
FIG. 2 is a flowchart of a process for information processing according to an embodiment of the present disclosure.

A process for storage management according to an embodiment of the present disclosure will be described below with reference to FIG. 2. FIG. 2 is a flowchart of process 200 for information processing according to some embodiments of the present disclosure. Process 200 may be implemented, for example, by management device 120 shown in FIG. 1. Process 200 will be described below with reference to FIG. 1.

In block 202, in response to an update request for a first item in file system 110, management device 120 updates first attribute information associated with the first item in ordered data set 130. As discussed above, ordered data set 130 includes a plurality of entries 135 corresponding to a plurality of items in file system 110, and the plurality of entries 135 indicate path information 140 of storage paths of the plurality of items and attribute information 145 associated with the plurality of items. Entries 135 corresponding to items under the same directory are consecutively organized in ordered data set 130. In some embodiments, the updating may include updating an existing file or directory. In addition, the updating may also include adding a new file or directory. Alternatively, the updating may also include deleting an existing file or directory.

Generally, path information 140 is represented by a combination of paths to parent directories and names of the items. For example, a path to root directory 115-1 may be represented as "/root," and a path to subdirectory 115-2 may be represented as "/root/folder1." However, based on such a path representation manner, items associated with each other as parents and children are consecutively organized preferentially in the data set. For example, an entry corresponding to subdirectory 115-4 may be organized next to an entry corresponding to subdirectory 115-2. As discussed above, in such a manner, such an organization manner is very inefficient since updating the attribute information may involve a large number of parent directories.

According to the embodiment of the present disclosure, entries 135 are organized in a breadth-first fashion by ordered data set 130. Specifically, different from a conventional path, path information 140 may include a first field indicating paths to parent directories of the items, a second field indicating separators, and a third field indicating names of the items, wherein the first field does not include the separators. In some embodiments, the separators may be, for example, a character that cannot be used as an item name as set by file system 110.

Figure 3:
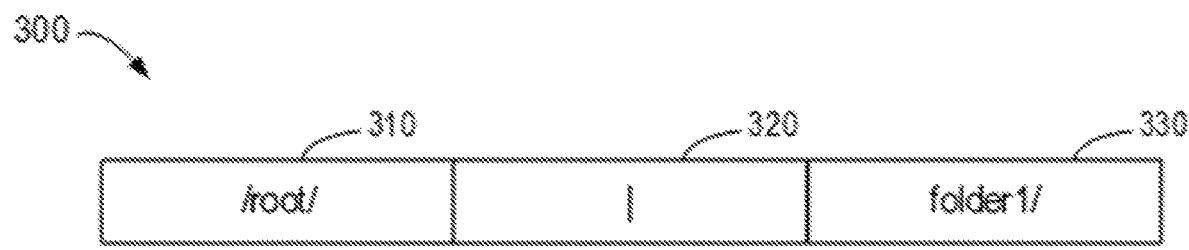
FIG. 3 is a schematic diagram of example path information according to an embodiment of the present disclosure.

In some examples, the separators may be, for example, specified as "|," and file system 110 may specify that the "|" character cannot be included in a file name or directory name, and that the "|" character takes precedence over any character allowed for naming by the file system 110. FIG. 3 shows example path information 300 according to an embodiment of the present disclosure. As shown in FIG. 3, a path to subdirectory 115-2 may include three parts: a first field "/root/" 310, indicating a path to root directory 115-1 of subdirectory 115-2; a second field "|" 320, indicating a separator; and a third field "folder1/" 330, indicating a name of subdirectory 115-2. In such a manner, the path to subdirectory 115-2 may be represented as "/root/|folder1/." Similarly, a path to subdirectory 115-3 may be represented as "/root/|folder2/."

It should be understood that the above specific examples of separator and path representations are only schematic, and any other appropriate separator and path representations can also be used without departing from the spirit of the present disclosure.

Additionally, the plurality of entries 135 are organized sequentially in ordered data set 130 in order of characters of path information 140. In such a manner, the organization form of the entries has changed from the conventional depth-first mode to a depth-first mode which is more suitable for file system management, thereby improving efficiency of the file system management.

In block 204, management device 120 determines a second item associated with the first item from file system 110, wherein a parent directory of the second item is the same as that of the first item.

In some embodiments, management device 120 may determine the associated second item through path information 140. Referring still to the example in FIG. 1, for example, the first item is file 115-5, and its path information may be, for example, represented as "/root/folder1/|file1." Management device 120 may determine, based on path information 140, a second path associated with the parent directory and different from a first path where the first item is located. For example, management device 120 may determine that the second path to the parent directory of the first item is "/root/folder1."

Further, management device 120 may determine the second item based on the second path. Specifically, management device 120 may search ordered data set 130 according to the determined second path, so as to determine a second item under the same directory as the first item, i.e., subdirectory 115-4.

In block 206, management device 120 acquires second attribute information associated with the second item from ordered data set 130. Referring still to the example in FIG. 1, management device 120 may conduct search and match in ordered data set 130 according to the second path, so as to acquire attribute information corresponding to subdirectory 115-4.

Ordered data set 130 is organized based on a breadth-first fashion, and entries corresponding to items under the same directory are always consecutively organized. Therefore, computing and time costs required by the second item can be greatly reduced.

In block 208, management device 120 determines, based at least on the first attribute information and the second attribute information, attribute information associated with the parent directory. Specifically, management device 120 may acquire all other items in the same directory as the first item is in and acquire their corresponding attribute information, so as to determine the attribute information corresponding to the parent directory.

Depending on a type of the attribute information, management device 120 may determine the attribute information of the parent directory through a corresponding logic. For example, by taking the size of a file or directory as an example, management device 120 may determine the total size of a parent directory by summing up the sizes of all files or directories under the directory. As another example, when the attribute information is latest modification time, management device 120 may keep latest modification time of all the files or directories under the directory as the latest modification time of the parent directory.

In some embodiments, management device 120 may further update the attribute information associated with the parent directory in ordered data set 130. In such a manner, the next time when the parent directory is read, management device 120 may directly read ordered data set 130 without recomputing, thereby reducing the computational burden.

It should be understood that management device 120 can traverse all parent directories of modified/created/deleted items, and iteratively update attribute information of the parent directories according to the method discussed above. In consideration of the fact that entries 135 are organized in a depth-first fashion in ordered data set 130, computation and time costs required by updating in such manner are greatly reduced, thus improving the management efficiency of the file system.

Figure 4:
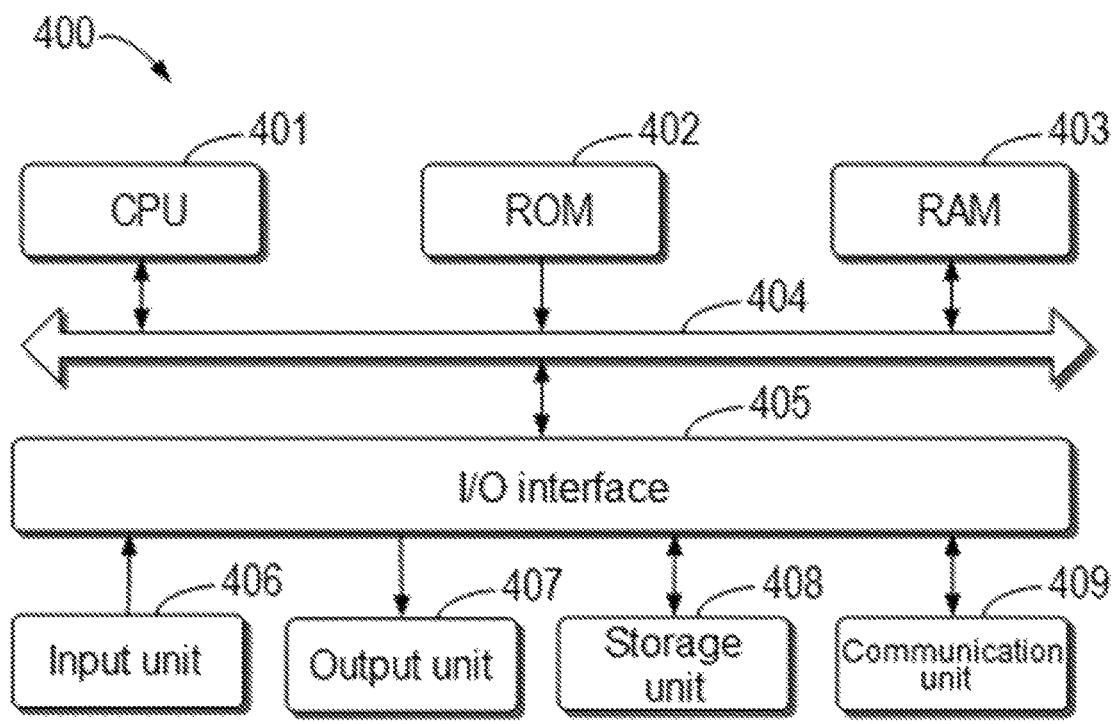
FIG. 4 is a schematic block diagram of an example device that can be configured to implement an embodiment of content of the present disclosure.

FIG. 4 is a schematic block diagram of example device 400 that can be configured to implement an embodiment of content of the present disclosure. For example, a backup system and/or a recovery system according to the embodiment of the present disclosure may be implemented by device 400. As shown in the figure, device 400 includes central processing unit (CPU) 401 that may perform various appropriate actions and processing according to computer program instructions stored in read-only memory (ROM) 402 or computer program instructions loaded from storage unit 408 to random access memory (RAM) 403. In RAM 403, various programs and data required for the operation of device 400 may also be stored. CPU 401, ROM 402, and RAM 403 are connected to each other through bus 404. Input/output (I/O) interface 405 is also connected to bus 404.

A plurality of components in device 400 are connected to I/O interface 405, including: input unit 406, such as a keyboard and a mouse; output unit 407, such as various types of displays and speakers; storage unit 408, such as a magnetic disk and an optical disc; and communication unit 409, such as a network card, a modem, and a wireless communication transceiver. Communication unit 409 allows device 400 to exchange information/data with other devices over a computer network such as the Internet and/or various telecommunication networks.

The various processes and processing described above, for example, process 200, may be performed by processing unit 401. For example, in some embodiments, process 200 may be implemented as a computer software program that is tangibly included in a machine-readable medium such as storage unit 408. In some embodiments, some or all of the computer program may be loaded and/or installed onto device 400 through ROM 402 and/or communication unit 409. When the computer program is loaded into RAM 403 and executed by CPU 401, one or more actions of process 200 described above may be implemented.

The present disclosure may be a method, an apparatus, a system, and/or a computer program product. The computer program product may include a computer-readable storage medium storing computer-readable program instructions for performing various aspects of the present disclosure.

The computer-readable storage medium may be a tangible device capable of retaining and storing instructions used by an instruction-executing device. The computer-readable storage medium may be, for example, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium as used here is not explained as transient signals themselves, such as radio waves or other electromagnetic waves propagated freely, electromagnetic waves propagated through waveguides or other transmission media (e.g., light pulses propagated through fiber-optic cables), or electrical signals transmitted over electrical wires.

The computer-readable program instructions described here may be downloaded from the computer-readable storage medium to various computing/processing devices or downloaded to external computers or external storage devices over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, including object oriented programming languages, such as Smalltalk and C++, and conventional procedural programming languages, such as the "C" language or similar programming languages. The computer-readable program instructions may be executed completely on a user computer, partially on a user computer, as a separate software package, partially on a user computer and partially on a remote computer, or completely on a remote computer or server. In the case where a remote computer is involved, the remote computer may be connected to a user computer over any kind of network, including a local area network (LAN) or wide area network (WAN), or may be connected to an external computer (e.g., connected over the Internet using an Internet service provider). In some embodiments, an electronic circuit, such as a programmable logic circuit, a field programmable gate array (FPGA), or a programmable logic array (PLA), may be customized by utilizing state information of the computer-readable program instructions. The electronic circuit can execute the computer-readable program instructions to implement various aspects of the present disclosure.

Various aspects of the present disclosure are described here with reference to flowcharts and/or block diagrams of the method, the apparatus (system), and the computer program product implemented according to the embodiments of the present disclosure. It should be understood that each block in the flowcharts and/or block diagrams and a combination of blocks in the flowcharts and/or block diagrams may be implemented by computer-readable program instructions.

The computer-readable program instructions may be provided to a processing unit of a general purpose computer, a special purpose computer, or another programmable data processing apparatus to produce a machine, such that the instructions, when executed by the processing unit of the computer or another programmable data processing apparatus, generate an apparatus for implementing the functions/actions specified in one or more blocks in the flowchart and/or block diagrams. The computer-readable program instructions may also be stored in a computer-readable storage medium, and the instructions cause a computer, a programmable data processing apparatus, and/or other devices to work in a specific manner, such that the computer-readable medium storing the instructions includes an article of manufacture including instructions for implementing various aspects of functions/actions specified by one or more blocks in the flowcharts and/or block diagrams.

The computer-readable program instructions may also be loaded onto a computer, another programmable data processing apparatus, or another device, such that a series of operational steps are performed on the computer, another programmable data processing apparatus, or another device to produce a computer implemented process. As such, the instructions executed on the computer, another programmable data processing apparatus, or another device implement the functions/actions specified in one or more blocks in the flowcharts and/or block diagrams.

The flowcharts and block diagrams in the accompanying drawings illustrate the architectures, functions, and operations of possible implementations of systems, methods, and computer program products according to multiple embodiments of the present disclosure. In this regard, each block in the flowcharts or block diagrams may represent a module, a program segment, or a portion of an instruction that includes one or more executable instructions for implementing specified logical functions. In some alternative implementations, functions labeled in the blocks may occur in an order different from that as labeled in the accompanying drawing. For example, two successive blocks may actually be performed basically in parallel, or they may be performed in an opposite order sometimes, depending on the functions involved. It also should be noted that each block in the block diagrams and/or flowcharts and a combination of blocks in the block diagrams and/or flowcharts may be implemented using a dedicated hardware-based system for executing specified functions or actions, or may be implemented using a combination of dedicated hardware and computer instructions.

Various implementations of the present disclosure have been described above. The foregoing description is illustrative rather than exhaustive, and is not limited to the disclosed implementations. Numerous modifications and changes are apparent to those of ordinary skill in the art without departing from the scope and spirit of the various illustrated implementations. The selection of terms as used herein is intended to best explain the principles and practical applications of the various implementations or technical improvements of the technologies on the market, or to enable other persons of ordinary skill in the art to understand the implementations disclosed herein.

What is claimed is:
1. A method, comprising:
in response to an update request for a first item in a file system, updating, by a system comprising a processor, first attribute information associated with the first item in an ordered data set, the ordered data set comprising a plurality of entries corresponding to a plurality of items in the file system, the plurality of entries indicating path information of storage paths of the plurality of items and attribute information associated with the plurality of items, and entries corresponding to items under the same directory being consecutively organized in the ordered data set according to a breadth-first technique or a depth-first technique;
determining, by the system, a second item associated with the first item from the file system, wherein a parent directory of the second item is the same as that of the first item;
acquiring, by the system, second attribute information associated with the second item from the ordered data set;
determining, by the system and based on at least the first attribute information and the second attribute information, attribute information associated with the parent directory; and
storing the attribute information in a memory of the system.

2. The method of claim 1, wherein the first item comprises a directory or a file.

3. The method of claim 1, wherein determining the second item comprises:
   determining, by the system and based on the path information, a second path associated with the parent directory and different from a first path where the first item is located; and
   determining, by the system, the second item based on the second path.

4. The method of claim 1, wherein
   the path information comprises a first field indicating paths to parent directories of the items, a second field indicating separators, and a third field indicating names of the items, and
   the first field does not comprise the separators.

5. The method of claim 1, wherein the plurality of entries is organized sequentially in the ordered data set in order of characters of the path information.

6. The method of claim 1, further comprising:
   updating, by the system, the attribute information associated with the parent directory in the ordered data set.

7. A device, comprising:
   at least one processing unit; and
   at least one memory coupled to the at least one processing unit and storing instructions configured to be executed by the at least one processing unit, wherein when executed by the at least one processing unit, the instructions cause the device to perform operations comprising:
      updating, in response to an update request for a first item in a file system, first attribute information associated with the first item in an ordered data set, the ordered data set comprising a plurality of entries corresponding to a plurality of items in the file system, the plurality of entries indicating path information of storage paths of the plurality of items and attribute information associated with the plurality of items, and entries corresponding to items under the same directory being consecutively organized in the ordered data set according to a breadth-first technique;
      determining a second item associated with the first item from the file system, a parent directory of the second item being the same as that of the first item;
      acquiring second attribute information associated with the second item from the ordered data set;
      determining, based on at least the first attribute information and the second attribute information, attribute information associated with the parent directory; and
      storing the attribute information in a memory of the system.

8. The device of claim 7, wherein the first item comprises a directory or a file.

9. The device of claim 7, wherein determining the second item comprises:
   determining, based on the path information, a second path associated with the parent directory and different from a first path where the first item is located; and
   determining the second item based on the second path.

10. The device of claim 7, wherein the path information comprises a first field indicating paths to parent directories of the items, a second field indicating separators, and a third field indicating names of the items, and the first field does not comprise the separators.

11. The device of claim 10, wherein the first field does not comprise the separators.

12. The device of claim 7, wherein the plurality of entries is organized sequentially in the ordered data set in order of characters of the path information.

13. The device of claim 7, wherein the operations further comprise:
   updating the attribute information associated with the parent directory in the ordered data set.

14. A computer program product tangibly stored in a non-transitory computer storage medium and comprising machine-executable instructions, wherein when run in a device, the machine-executable instructions cause the device to perform operations comprising:
   updating, in response to an update request for a first item in a file system, first attribute information associated with the first item in an ordered data set, the ordered data set comprising a plurality of entries corresponding to a plurality of items in the file system, the plurality of entries indicating path information of storage paths of the plurality of items and attribute information associated with the plurality of items, and entries corresponding to items under the same directory being consecutively organized in the ordered data set according to a depth-first technique;
   determining a second item associated with the first item from the file system, a parent directory of the second item being the same as that of the first item;
   acquiring second attribute information associated with the second item from the ordered data set;
   determining, based on at least the first attribute information and the second attribute information, attribute information associated with the parent directory; and
   storing the attribute information in a memory of the system.

15. The computer program product of claim 14, wherein the first item comprises a directory or a file.

16. The computer program product of claim 14, wherein determining the second item comprises:
   determining, based on the path information, a second path associated with the parent directory and different from a first path where the first item is located.

17. The computer program product of claim 16, wherein determining the second item further comprises:
   determining the second item based on the second path.

18. The computer program product of claim 14, wherein the path information comprises a first field indicating paths to parent directories of the items, a second field indicating separators, and a third field indicating names of the items, and the first field does not comprise the separators.

19. The computer program product of claim 14, wherein the plurality of entries is organized sequentially in the ordered data set in order of characters of the path information.

20. The computer program product of claim 14, wherein the operations further comprise:
   updating the attribute information associated with the parent directory in the ordered data set.

* * * * *